United States Patent
Ho et al.

(10) Patent No.: US 8,135,171 B2
(45) Date of Patent: Mar. 13, 2012

(54) MULTIPOINT TRACKING METHOD AND RELATED DEVICE

(75) Inventors: Chen-Hsiang Ho, Hsin-Chu (TW);
Chia-Feng Yang, Hsin-Chu (TW);
Yu-Min Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 876 days.

(21) Appl. No.: 12/194,530

(22) Filed: Aug. 19, 2008

(65) Prior Publication Data

US 2010/0046850 A1 Feb. 25, 2010

(51) Int. Cl.
*G06K 9/34* (2006.01)
*G06K 9/36* (2006.01)
*G06T 5/30* (2006.01)

(52) U.S. Cl. ......... 382/103; 382/180; 382/260; 382/288

(58) Field of Classification Search .................. 382/103, 382/257, 180, 199, 258, 260, 264, 288; 348/169–172; 345/173, 174, 178
See application file for complete search history.

(56) References Cited

U.S. PATENT DOCUMENTS

| | | | | |
|---|---|---|---|---|
| 6,233,007 B1* | 5/2001 | Carlbom et al. | ............... | 348/157 |
| 6,570,608 B1* | 5/2003 | Tserng | ............... | 348/143 |
| 7,236,162 B2* | 6/2007 | Morrison et al. | ............... | 345/173 |
| 2004/0081287 A1* | 4/2004 | Lang et al. | ............... | 378/210 |
| 2005/0031165 A1* | 2/2005 | Olson et al. | ............... | 382/103 |
| 2008/0204426 A1* | 8/2008 | Hotelling et al. | ............... | 345/173 |
| 2009/0161981 A1* | 6/2009 | Allen | ............... | 382/275 |
| 2010/0201631 A1* | 8/2010 | Taylor et al. | ............... | 345/173 |

OTHER PUBLICATIONS

A Multi-Touch Digital Painting Application, May 31, 2007.
Large-Scale Display Interaction Techniques to Support Face-to-Face Collaboration, A thesis submitted in partial fulfilment of the requirements for the Degree of Master of Science in Computer Science in the University of Canterbury by David Thompson, p. 34, Dec. 31, 2006.

* cited by examiner

*Primary Examiner* — Jon Chang
(74) *Attorney, Agent, or Firm* — Winston Hsu; Scott Margo

(57) ABSTRACT

Multipoint tracking is performed by receiving raw data of an image, calculating line average values for a plurality of lines of the raw data, filtering the raw data according to the line average values to generate filtered data, performing a dilation algorithm on the filtered data to generate dilated data, performing an erosion algorithm on the dilated data to generate eroded data, performing edge detection on the eroded data for identifying touch regions of the raw data, performing a labeling algorithm on the touch regions, calculating centers of gravity for the touch regions, and generating a multipoint tracking result according to the centers of gravity.

19 Claims, 10 Drawing Sheets

MULTIPOINT TRACKING METHOD AND RELATED DEVICE

BACKGROUND OF THE INVENTION

1. Field of the Invention

The present invention relates to methods and devices for performing multipoint tracking, and particularly, to a method of performing multipoint tracking and related device which incorporate dilation and erosion algorithms.

2. Description of the Prior Art

For many years, a keyboard and a mouse have been most widely adopted as input interface devices for a user to interact with a computer. Clicking, dragging, and scrolling functions are easily performed through use of the mouse, which allows the user to launch applications and activate menu items. The keyboard provides typing and shortcut key input methods for rapid entry of text and numerical data, as well as quick access to the applications and menu items.

Another type of input interface device commonly utilized as a replacement for the mouse is a touchpad. The touchpad may be utilized to detect contact with the touchpad by a stylus or a user's finger, and track movement and tapping of the stylus or finger to control operation of the computer. The touchpad has found widespread application in mobile computing devices such as notebook computers and PDAs.

FIG. 1 is a diagram of a multi-touch input detected by a touchpad device. Multi-touch technology is simultaneous tracking of multiple contacts 101-106 with the touchpad, and has been in development since 1982. However, application of the multi-touch technology to consumer devices, such as notebook computers and cell phones, has only recently begun gaining popularity. Typically, multi-touch input requires detection of the multiple contacts 101-106 in raw data 100, and may include use of a gradient image processing method for finding touch regions of the multiple contacts, which allows for calculation of number of the contacts and positions of the contacts. However, in the presence of noise, or when the touchpad has a malfunction, e.g. a damaged sensor row 110, one touch region may be detected as multiple touch regions, resulting in erroneous calculation of the number of contacts and the position of the one contact. For example, in FIG. 1, the touch regions 102 and 103 are both split by a dead row (indicated by an arrow) of the touchpad. Thus, the prior art may detect eight touch regions, instead of six, and the relative positions of the touch regions 102 and 103 will be inaccurate.

SUMMARY OF THE INVENTION

According to an embodiment of the present invention, a method of performing multipoint tracking comprises receiving raw data of an image, calculating line average values for a plurality of lines of the raw data, filtering the raw data according to the line average values to generate filtered data, performing a dilation algorithm on the filtered data to generate dilated data, performing an erosion algorithm on the dilated data to generate eroded data, performing edge detection on the eroded data for identifying touch regions of the raw data, performing a labeling algorithm on the touch regions, calculating centers of gravity for the touch regions, and generating a multipoint tracking result according to the centers of gravity.

According to another embodiment of the present invention, a multipoint tracking device comprises a receiver module for receiving raw data of an image, a line average module for calculating a line average value for each of a plurality of lines of the raw data, a filter module for filtering the raw data, a dilation module for performing a dilation algorithm on the raw data, an erosion module for performing an erosion algorithm on the raw data, an edge detection module for performing edge detection for identifying touch regions of the raw data, a labeling module for performing a labeling algorithm on the touch regions, a center of gravity module for calculating a center of gravity for each of the touch regions, and an output module for outputting a multipoint tracking result based on the centers of gravity calculated for each of the touch regions.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
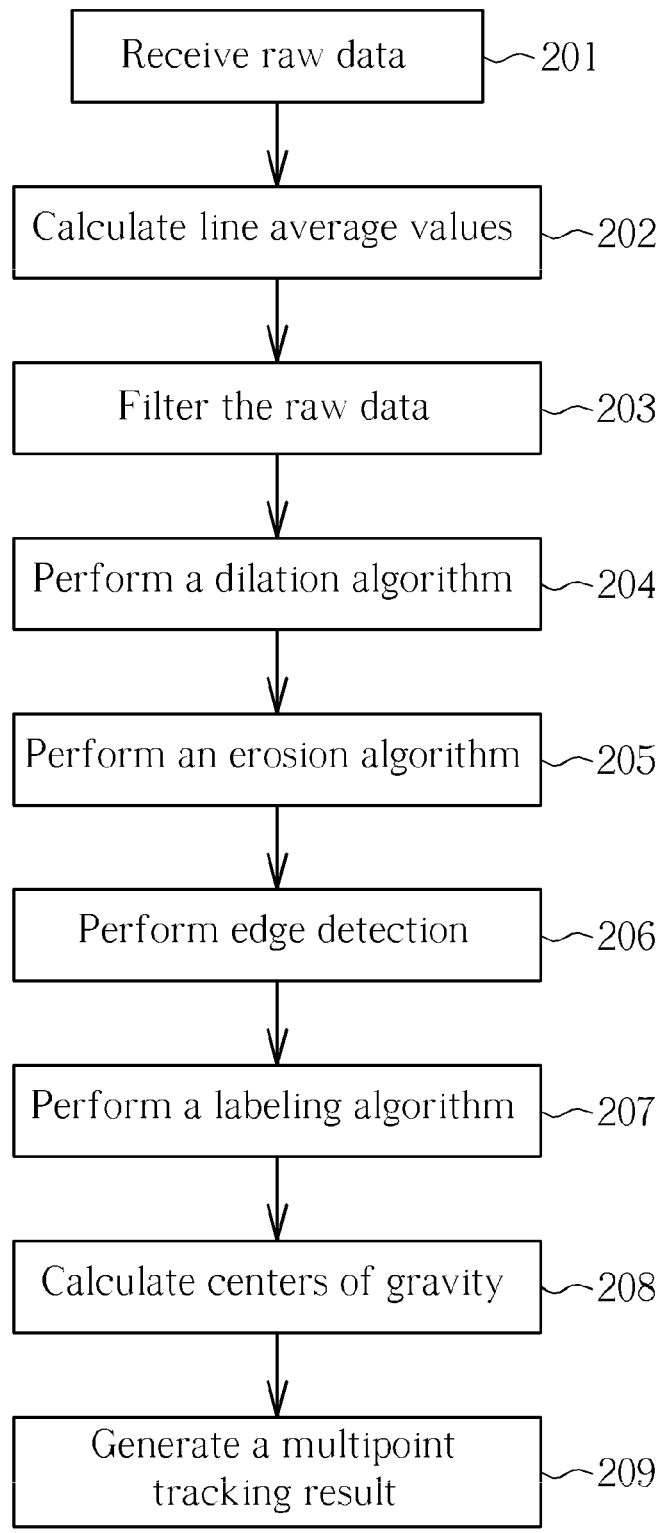
FIG. 2 is a flowchart of a method for performing multipoint tracking according to an embodiment of the present invention.

FIG. 2 is a flowchart of a method for performing multipoint tracking according to an embodiment of the present invention. The method comprises the following steps:

Step 201: Receive raw data.
Step 202: Calculate line average values for a plurality of lines of the raw data.
Step 203: Filter the raw data according to the line average values to generate filtered data.
Step 204: Perform a dilation algorithm on the filtered data to generate dilated data.
Step 205: Perform an erosion algorithm on the dilated data to generate eroded data.
Step 206: Perform edge detection on the eroded data for identifying touch regions.
Step 207: Perform a labeling algorithm on the touch regions.
Step 208: Calculate centers of gravity for the touch regions.
Step 209: Generate a multipoint tracking result according to the centers of gravity.

Figure 1:
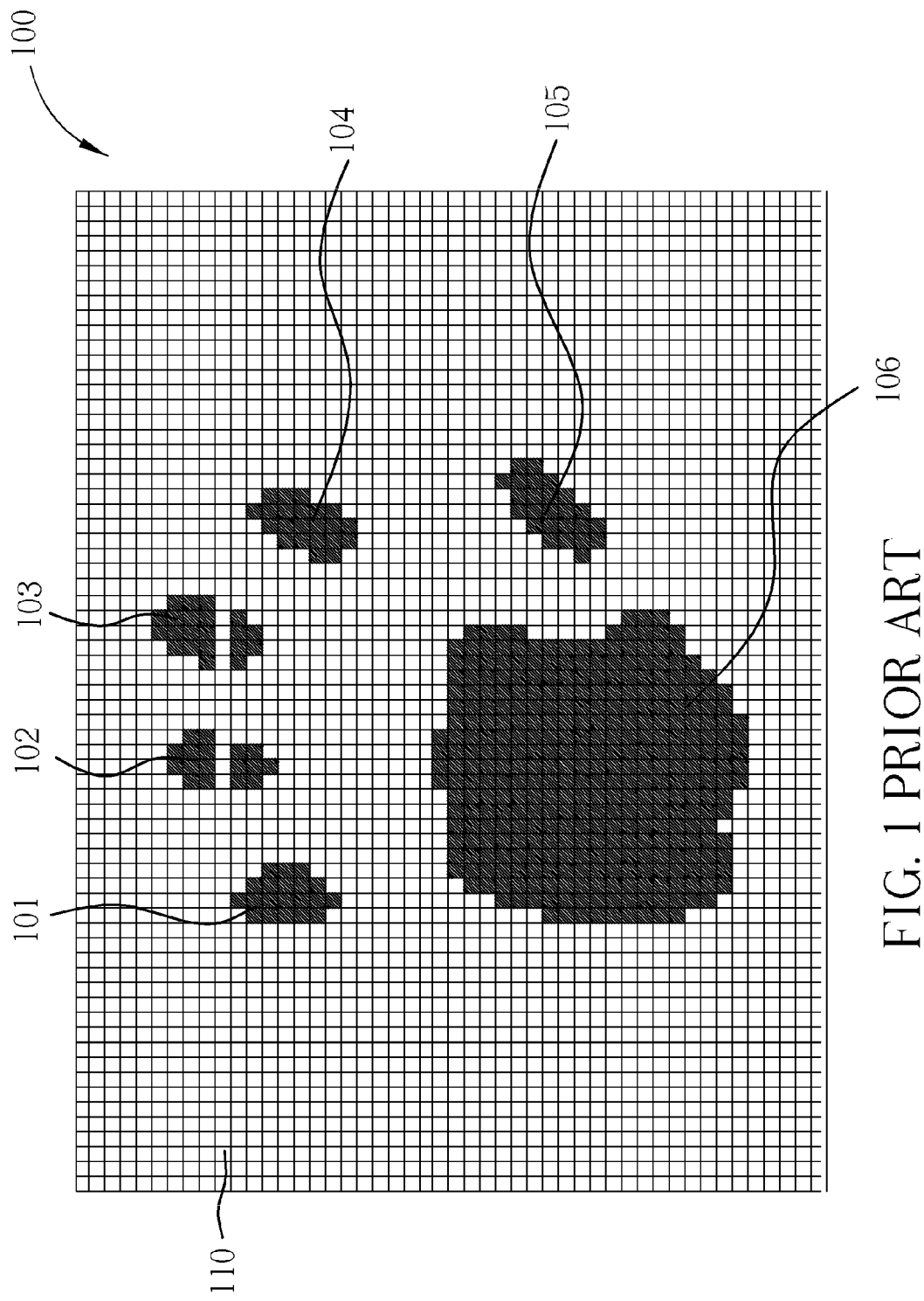
FIG. 1 is a diagram of a multi-touch input to a touchpad device according to the prior art.

The method for performing multipoint tracking according to the embodiment of the present invention starts with receiving raw data of an image (Step 201). The raw data, such as the raw data 100 of FIG. 1, may be generated by a touch panel input device based on a user input. The raw data 100 includes a plurality of lines, e.g. rows or columns. If the multi-touch input is affected by the damaged sensor row 110, one touch region may be detected as multiple touch regions, e.g. the touch regions 102 and 103, resulting in erroneous calculation of the number of contacts and the position of the one contact.

Thus, to overcome the error described above, the method further comprises performing a dilation algorithm (Step 204). Before performing the dilation algorithm (Step 204), line average values of the plurality of lines of the raw data 100 are calculated (Step 202), and the raw data 100 is filtered according to the line average values (Step 203). The raw data 100 may be filtered by setting a threshold value for each of the line average values, comparing each point of the raw data with the threshold value of the line average for the line of the point, determining points as touch points according to the threshold value, and combining the touch points to determine the touch regions. The touch points may be points under the threshold value or points above the threshold value according to design decisions.

Figure 3:
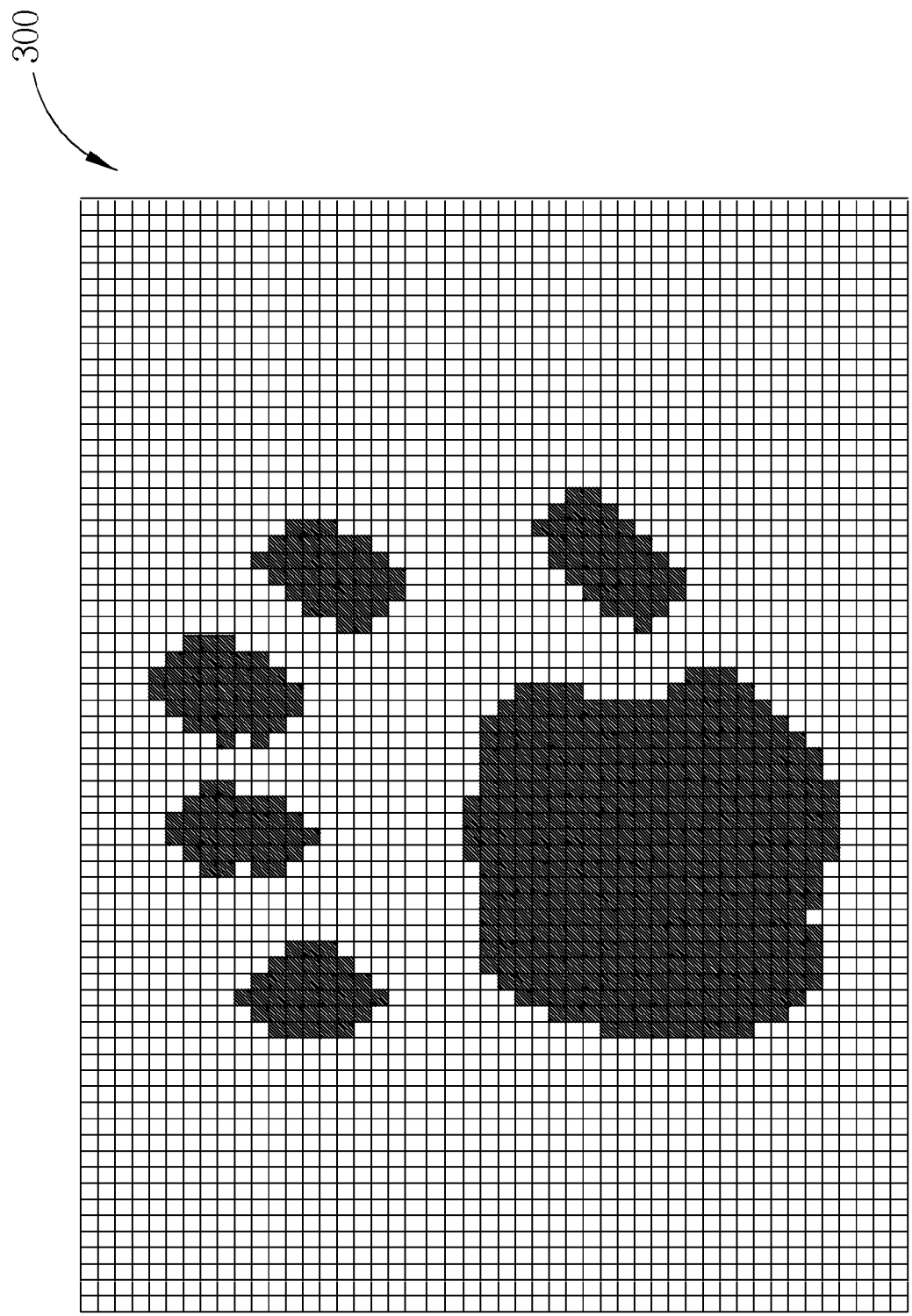
FIG. 3 is a diagram of a dilated multi-touch input after performing a dilation algorithm of the method of FIG. 2.
Figure 7:
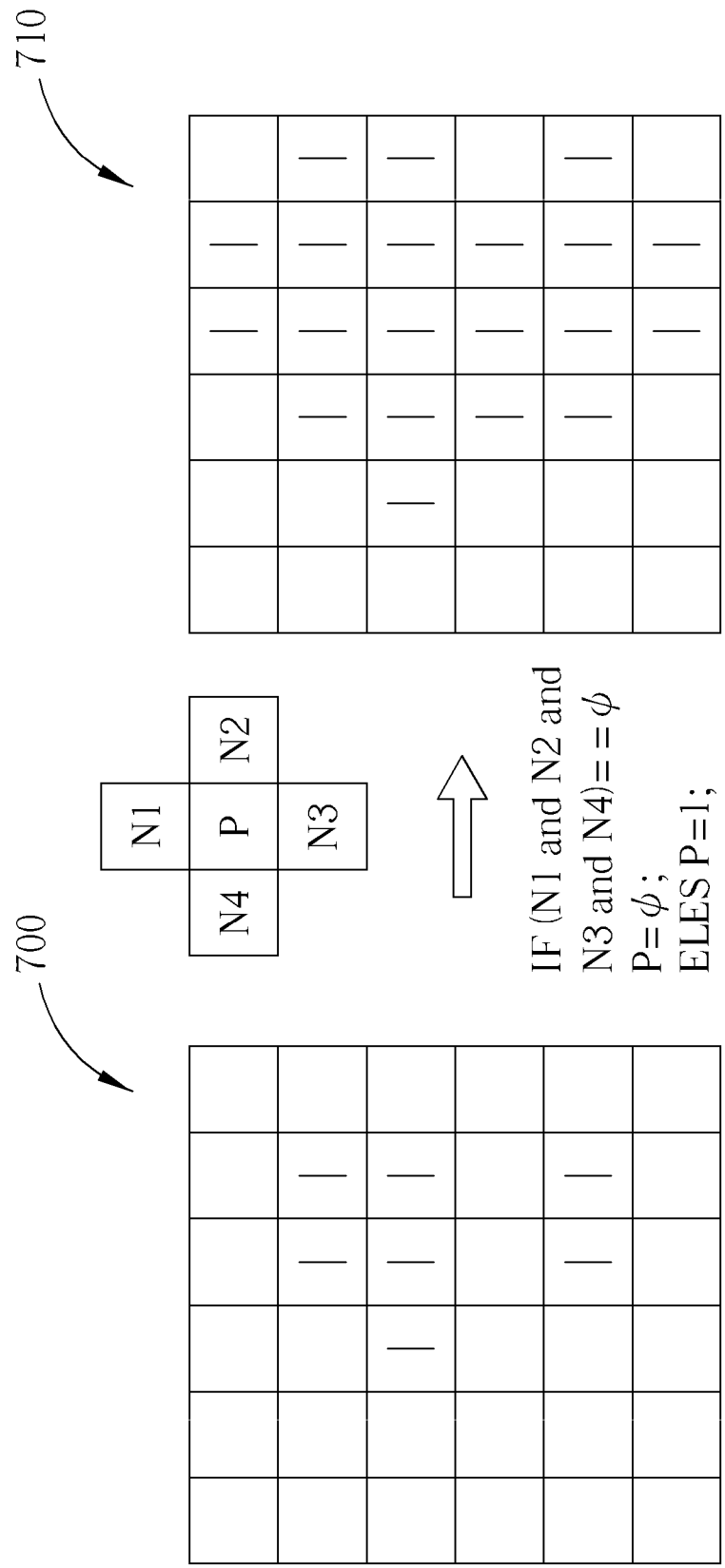
FIG. 7 is a diagram showing an embodiment of the dilation algorithm of the method of FIG. 2.

The filtered data generated as described above may then be utilized as input to the dilation algorithm. FIG. 3 is a diagram of a dilated multi-touch input after performing the dilation algorithm of the method of FIG. 2 on the filtered data to generate dilated data 300. The dilation algorithm is illustrated in FIG. 7. As shown, for filtered data 700, if any vertically or horizontally adjacent point (N1-N4) to a central point P is of a first predetermined value, e.g. 1, then the central point P is assigned the first predetermined value in the corresponding dilated data 710. In other words, if all of the vertically and horizontally adjacent points N1-N4 are of a second predetermined value, e.g. 0, then the central point P is assigned the second predetermined value. By performing the dilation algorithm, the raw data affected by the damaged sensor row may be restored.

Figure 4:
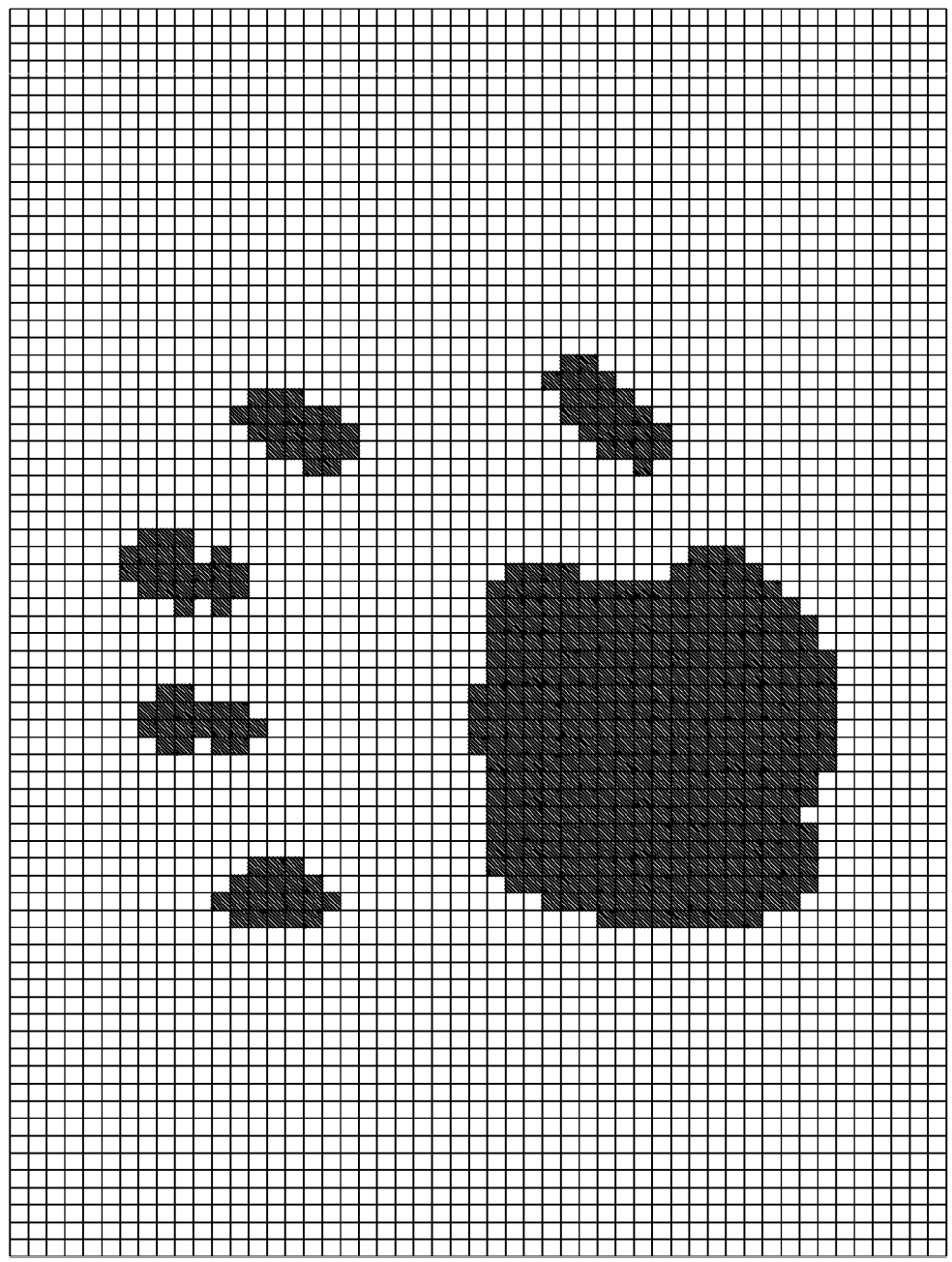
FIG. 4 is a diagram of an eroded multi-touch input after performing an erosion algorithm of the method of FIG. 2.
Figure 8:
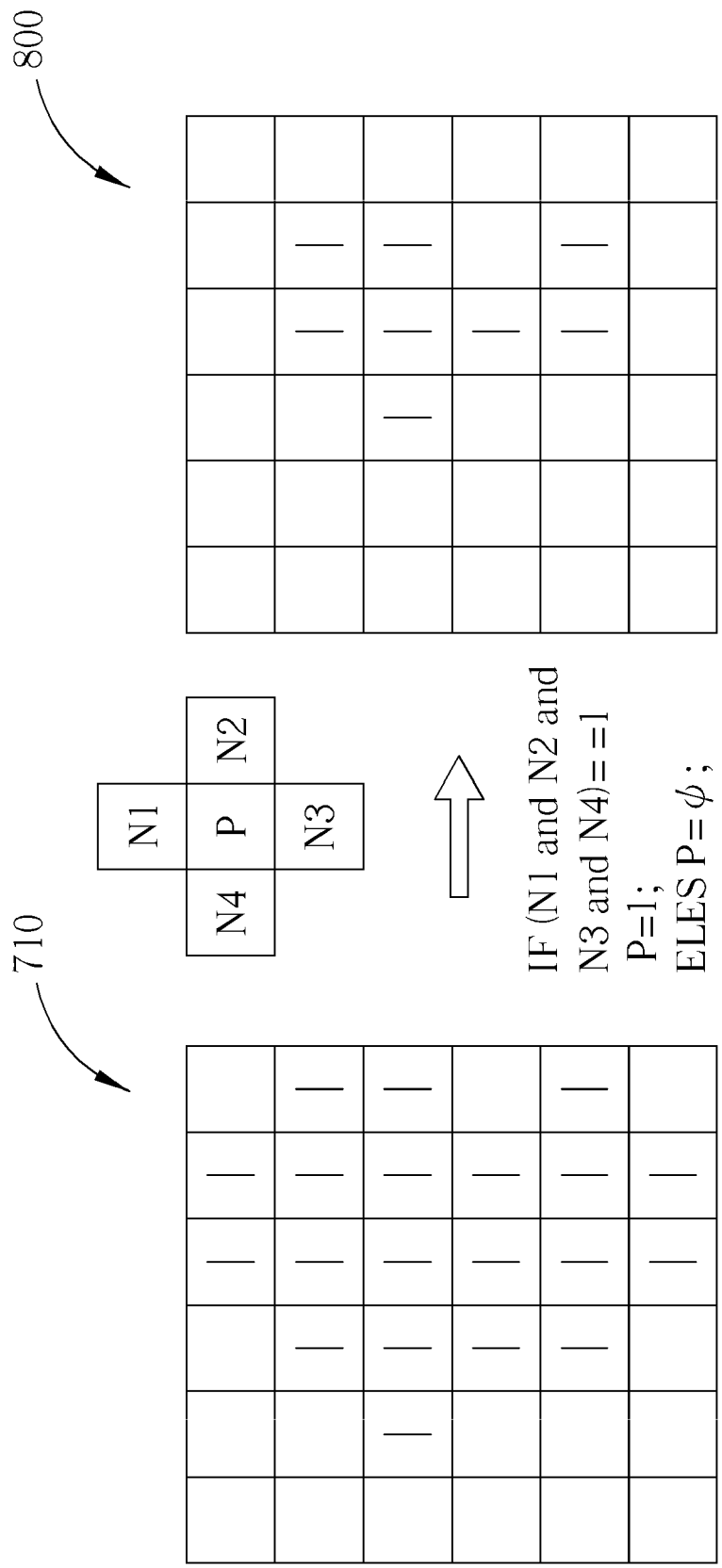
FIG. 8 is a diagram showing an embodiment of the erosion algorithm of the method of FIG. 2.

Once the dilated data has been generated (Step 204), the erosion algorithm is performed on the dilated data to generate the eroded data (Step 205). FIG. 4 is a diagram of an eroded multi-touch input after performing the erosion algorithm of the method of FIG. 2 on the dilated data to generate eroded data 400. The erosion algorithm is illustrated in FIG. 8. As shown, for the dilated data 710, each central point P is assigned to be 1 if all of the vertically and horizontally adjacent points N1-N4 are 1. In other words, if any of the vertically or horizontally adjacent points N1-N4 is 0, the central point P also becomes 0. After performing the erosion algorithm on the dilated data 710, eroded data 800 is formed.

Figure 5:
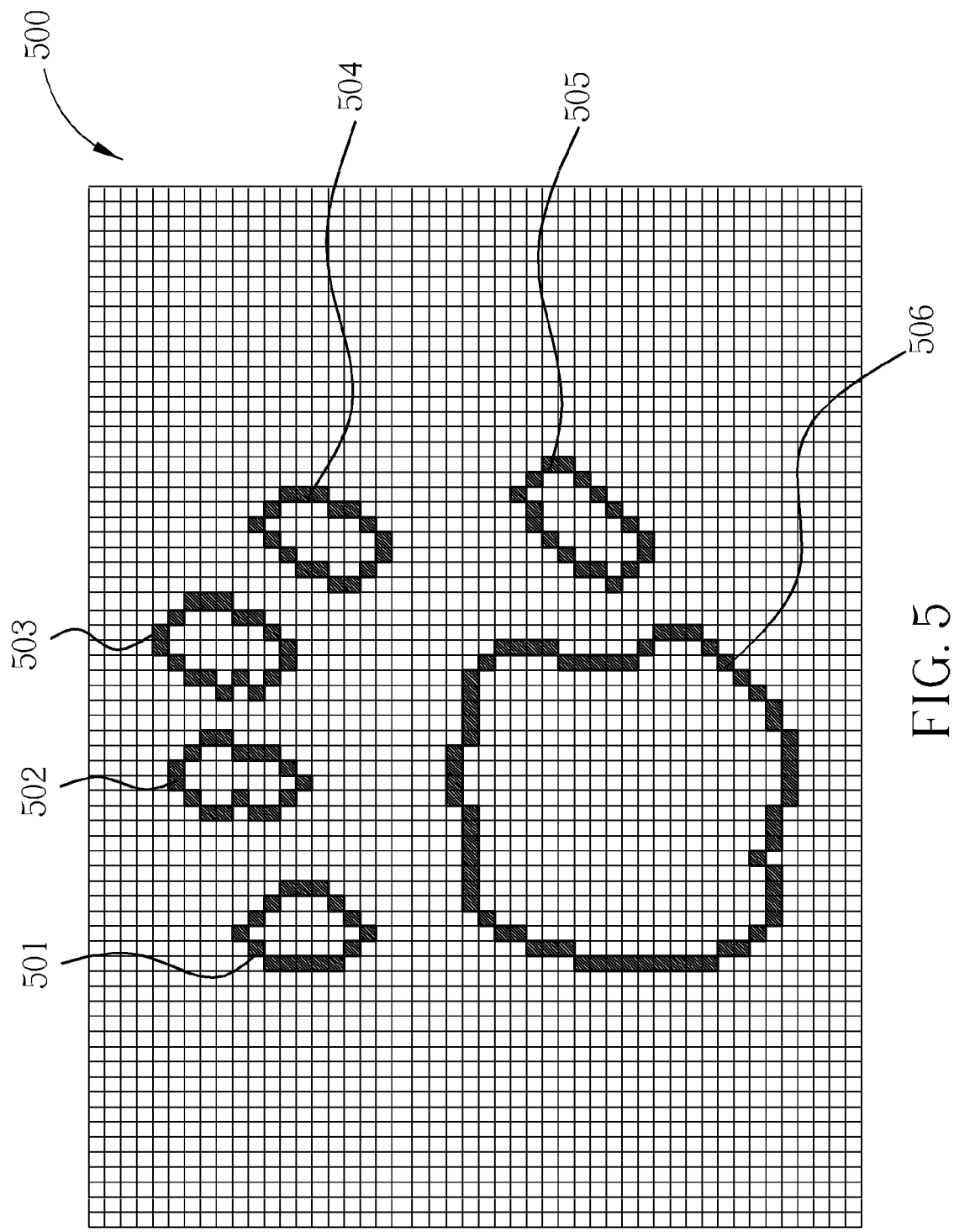
FIG. 5 is a diagram of touch regions corresponding to the eroded multi-touch input of FIG. 4 determined by an edge detection algorithm of the method of FIG. 2.
Figure 9:
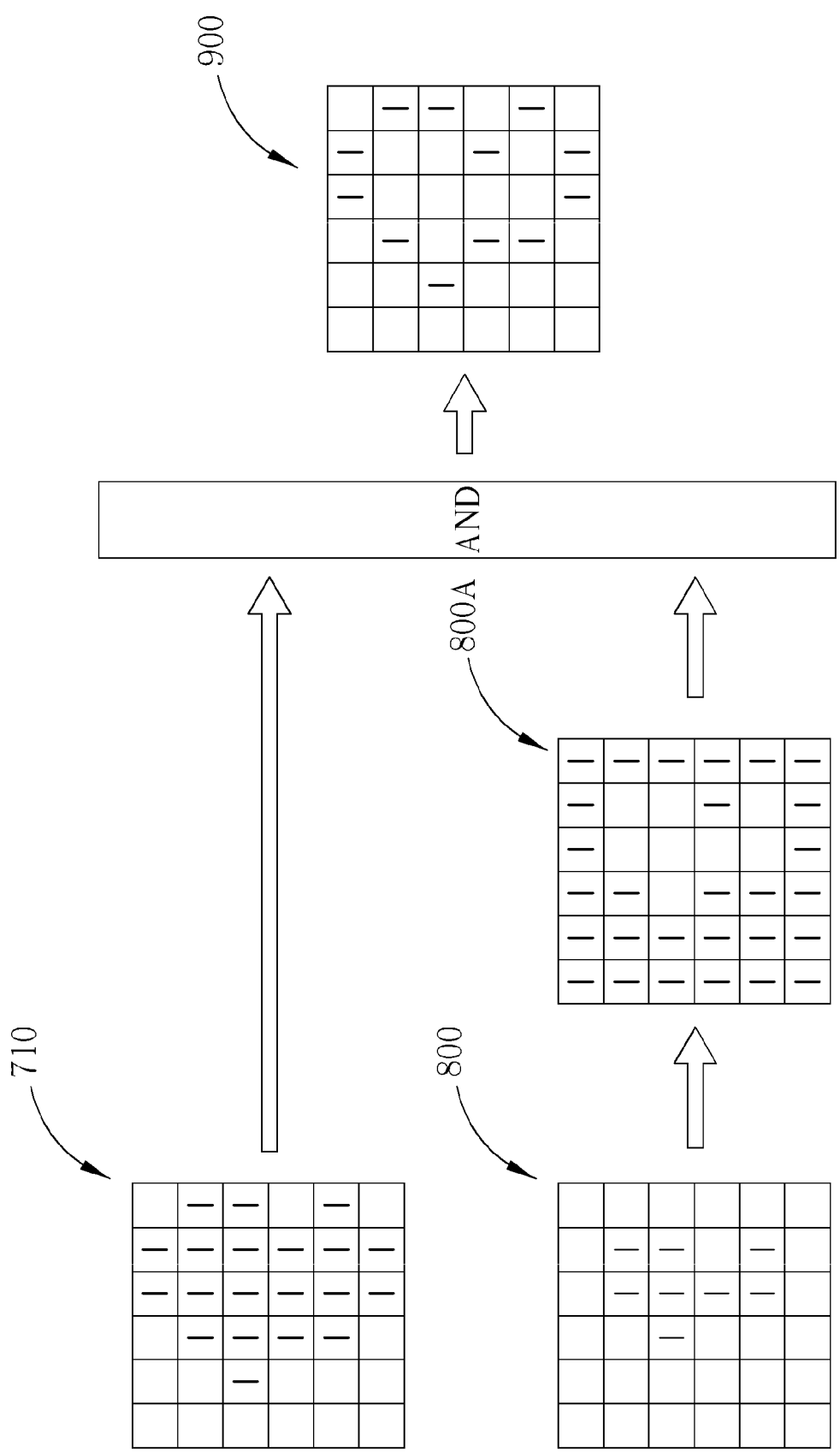
FIG. 9 is a diagram showing an embodiment of the edge detection algorithm of the method of FIG. 2.

After generating the dilated data (Step 204) and generating the eroded data (Step 205), edge detection may be performed on the eroded data for identifying touch regions of the raw data (Step 206). FIG. 5 is a diagram of touch regions 501-506 of edge data 500 determined by the edge detection algorithm of the method of FIG. 2. The edge detection algorithm is illustrated in FIG. 9. As shown, an AND operation may be performed on the dilated data 710 and an inverted erosion data 800A generated from the erosion data 800 to form edge data 900. The inverted erosion data 800A may be generated by performing a NOT operation on the erosion data 800, forming an inverted result of the erosion algorithm, as shown. As can be seen from the edge data 500 of FIG. 5, the touch regions 502 and 503 corresponding to the touch regions 102 and 103 may now be detected as single touch regions, instead of multiple touch regions.

Figure 6:
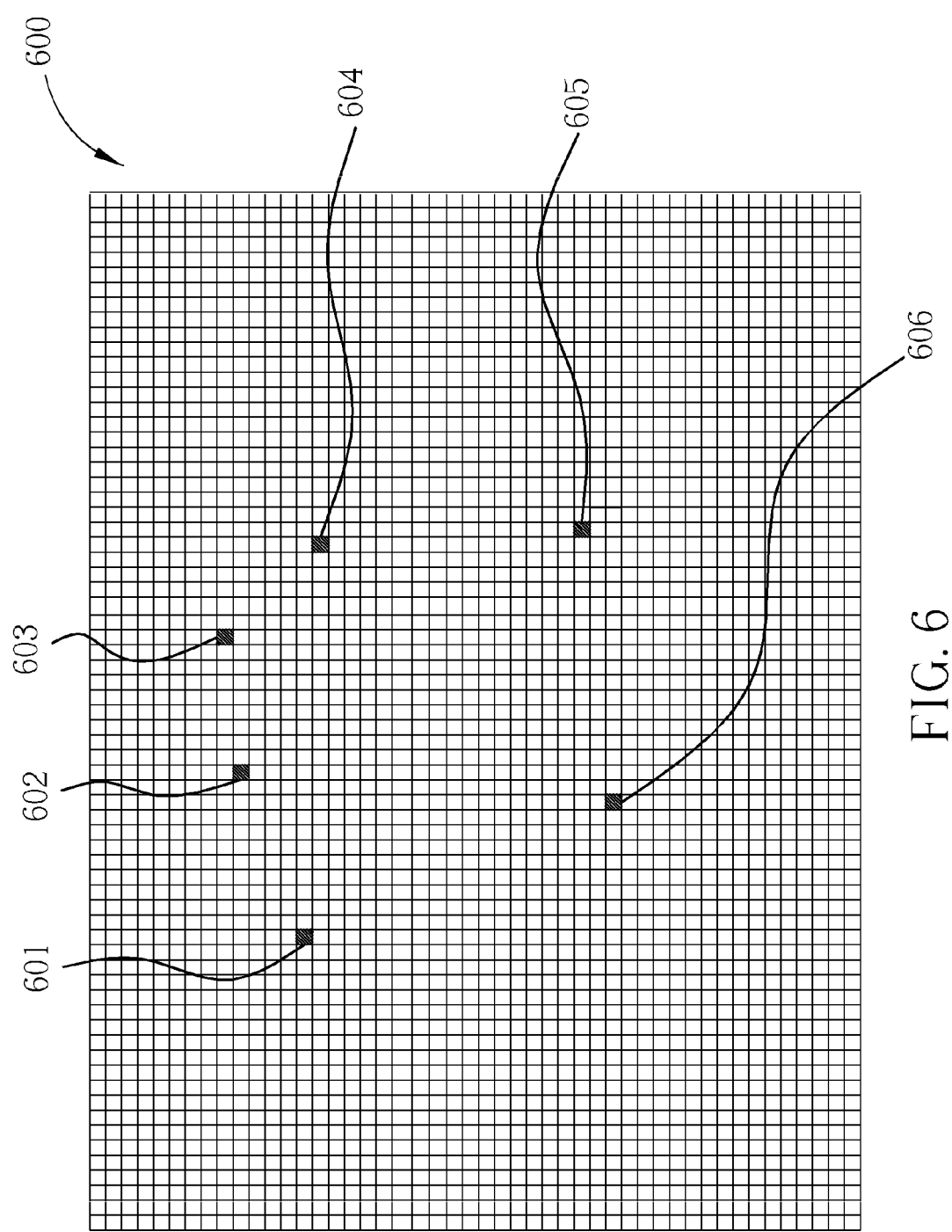
FIG. 6 is a diagram showing centers of gravity determined by the method of FIG. 2.

Once the touch regions 501-506 have been determined (Step 206), a labeling algorithm may be performed to label each of the touch regions (Step 207), and centers of gravity may be calculated for each of the touch regions 501-506 (Step 208). The labeling algorithm may apply different marks to edges corresponding to each touch region, and may also determine number of the touch regions. As shown in FIG. 6, six centers of gravity 601-606 are calculated corresponding to the touch regions 501-506. A multipoint tracking result may then be generated based on the centers of gravity (Step 209). For example, the centers of gravity 601-606 for each of the touch regions 501-506 may be determined as coordinate pairs corresponding to each of the touch regions 501-506 according to a center of gravity algorithm. Then, the coordinate pairs may be outputted as the multipoint tracking result.

Figure 10:
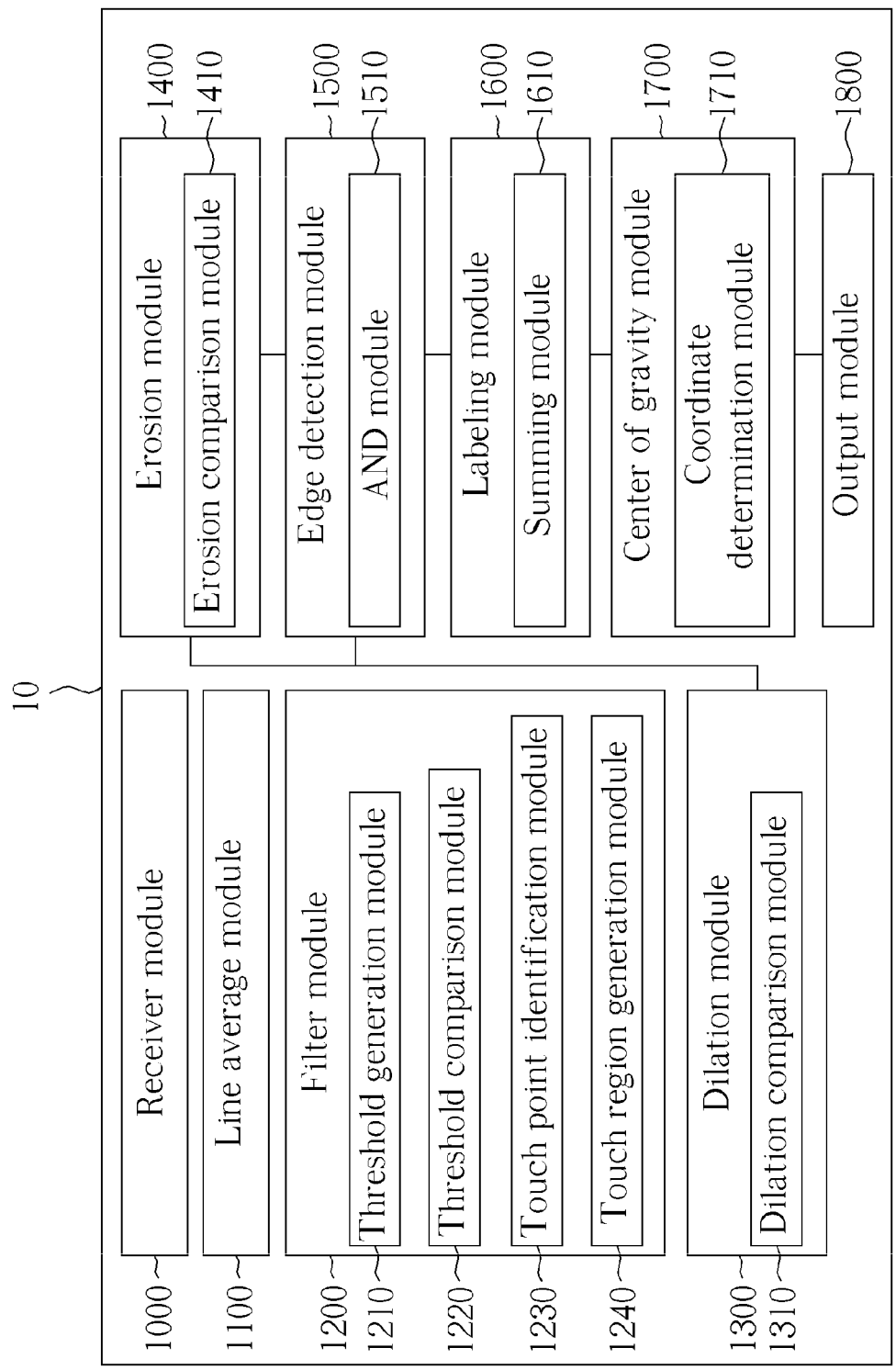
FIG. 10 is a diagram of a multipoint tracking device according to an embodiment of the present invention.

FIG. 10 is a diagram of a multipoint tracking device 10 according to an embodiment of the present invention. The multipoint tracking device 10 comprises a receiver module 1000 for receiving raw data of an image, a line average module 1100 for calculating a line average value for each of a plurality of lines of the raw data, a filter module 1200 for filtering the raw data, a dilation module 1300 for performing a dilation algorithm on the raw data, an erosion module 1400 for performing an erosion algorithm on the raw data, an edge detection module 1500 for performing edge detection for identifying touch regions of the raw data, a labeling module 1600 for performing a labeling algorithm on the touch regions, a center of gravity module 1700 for calculating a center of gravity for each of the touch regions, and an output module 1800 for outputting a multipoint tracking result based on the centers of gravity calculated for each of the touch regions. The edge detection module 1500 comprises an AND module 1510 for performing an AND operation on a result of the dilation algorithm and a result of the erosion algorithm. The dilation module 1300 comprises a dilation comparison module 1310 for comparing a point of the raw data with adjacent points of the raw data, e.g. comparing the point of the raw data with horizontally adjacent points and vertically adjacent points. The erosion module 1400 comprises an erosion comparison module 1410 for comparing a pixel of the raw data with horizontally adjacent pixels and vertically adjacent pixels. The filtering module 1200 comprises a threshold generation module 1210 for setting a threshold value for each of the line average values, a threshold comparison module 1220 for comparing each point with the threshold value of the line average for the line of the point, a touch point identification module 1230 for determining points under the threshold value as touch points, and a touch region generation module 1240 for combining the touch points to determine the touch regions. The labeling module 1600 is for applying different marks to edges corresponding to each touch region, and comprises a summing module 1610 for determining number of the touch regions. The center of gravity module 1700 comprises a coordinate determination module for determining a coordinate pair for each of the touch regions according to a center of gravity algorithm.

The method illustrated in FIGS. 2-9, and the related multipoint tracking device 10 illustrated in FIG. 10, utilize the dilation algorithm and the erosion algorithm to determine the edge of the touch region, which reduces the likelihood of erroneous detection of a single touch region as multiple touch regions when the raw data is affect, for example, by a dead or faulty sensor row.

Those skilled in the art will readily observe that numerous modifications and alterations of the device and method may be made while retaining the teachings of the invention.

What is claimed is:
1. A method of performing multipoint tracking, the method comprising:
  receiving raw data of an image;
  calculating line average values for a plurality of lines of the raw data;

filtering the raw data according to the line average values to generate filtered data;

performing a dilation algorithm on the filtered data to generate dilated data;

performing an erosion algorithm on the dilated data to generate eroded data;

performing edge detection on the eroded data for identifying touch regions of the eroded data;

performing a labeling algorithm on the touch regions;

calculating centers of gravity for the touch regions; and generating a multipoint tracking result according to the centers of gravity.

2. The method of claim 1, wherein performing edge detection for identifying the touch regions of the raw data is performing a logical AND on a result of the dilation algorithm and an inverted result of the erosion algorithm.

3. The method of claim 1, wherein performing the dilation algorithm on the filtered data is assigning a first predetermined value to a point of the filtered data when an adjacent point is of the first predetermined value.

4. The method of claim 3, wherein assigning the first predetermined value to the point of the filtered data when the point or the adjacent point is of the first predetermined value is assigning the first predetermined value to the point of the filtered data when a horizontally adjacent point or a vertically adjacent point is of the first predetermined value.

5. The method of claim 1, wherein performing the erosion algorithm on the dilated data is assigning a second predetermined value to a pixel of the dilated data when part of horizontally adjacent pixels and all vertically adjacent pixels are of a first predetermined value.

6. The method of claim 1, wherein filtering the raw data comprises:

setting a threshold value for each of the line average values;

comparing each point with the threshold value of the line average for the line of the point;

determining points as touch points according to the threshold value; and combining the touch points to determine the touch regions.

7. The method of claim 1, wherein performing the labeling algorithm on the touch regions is applying different marks to edges corresponding to each touch region.

8. The method of claim 1, wherein performing the labeling algorithm on the touch regions comprises determining number of the touch regions.

9. The method of claim 1, wherein calculating the center of gravity for each of the touch regions is determining a coordinate pair for each of the touch regions according to a center of gravity algorithm.

10. The method of claim 9, wherein generating the multipoint tracking result is outputting the coordinate pairs corresponding to the touch regions.

11. A multipoint tracking device comprising:

a receiver module for receiving raw data of an image;

a line average module for calculating a line average value for each of a plurality of lines of the raw data;

a filter module for filtering the raw data to generate filtered data;

a dilation module for performing a dilation algorithm on the filtered data to generate dilated data;

an erosion module for performing an erosion algorithm on the dilated data to generate eroded data;

an edge detection module for performing edge detection for identifying touch regions of the eroded data;

a labeling module for performing a labeling algorithm on the touch regions;

a center of gravity module for calculating a center of gravity for each of the touch regions; and an output module for outputting a multipoint tracking result based on the centers of gravity calculated for each of the touch regions.

12. The multipoint tracking device of claim 11, wherein the edge detection module comprises an AND module for performing an AND operation on a result of the dilation algorithm and a result of the erosion algorithm.

13. The multipoint tracking device of claim 11, wherein the dilation module comprises a dilation comparison module for comparing a point of the filtered data with adjacent points of the filtered data.

14. The multipoint tracking device of claim 13, wherein the dilation comparison module is for comparing the point of the filtered data with horizontally adjacent points and vertically adjacent points.

15. The multipoint tracking device of claim 11, wherein the erosion module comprises an erosion comparison module for comparing a pixel of the dilated data with horizontally adjacent pixels and vertically adjacent pixels.

16. The multipoint tracking device of claim 11, wherein the filtering module comprises:

a threshold generation module for setting a threshold value for each of the line average values;

a threshold comparison module for comparing each point with the threshold value of the line average for the line of the point;

a touch point identification module for determining points under the threshold value as touch points; and a touch region generation module for combining the touch points to determine the touch regions.

17. The multipoint tracking device of claim 11, wherein the labeling module is for applying different marks to edges corresponding to each touch region.

18. The multipoint tracking device of claim 11, wherein the labeling module comprises a summing module for determining number of the touch regions.

19. The multipoint tracking device of claim 11, wherein the center of gravity module comprises a coordinate determination module for determining a coordinate pair for each of the touch regions according to a center of gravity algorithm.

* * * * *